United States Patent
Pigouche et al.

(10) Patent No.: US 9,584,770 B2
(45) Date of Patent: Feb. 28, 2017

(54) METHOD AND SYSTEM FOR THE REAL-TIME DETERMINATION OF SIGNALS TO BE SUMMED FROM AMONG A SET OF RECEIVED SIGNALS

(71) Applicant: THALES, Neuilly-sur-Seine (FR)

(72) Inventors: Olivier Pigouche, Grasse (FR); Jean-Francois Blanc, Mandelieu (FR); Christophe Renard, Toulouse (FR); Jean-Philippe Mur, Mandelieur-la-Napoule (FR)

(73) Assignee: THALES, Courbevoie (FR)

( * ) Notice: Subject to any disclaimer, the term of this patent is extended or adjusted under 35 U.S.C. 154(b) by 428 days.

(21) Appl. No.: 14/081,341

(22) Filed: Nov. 15, 2013

(65) Prior Publication Data

US 2014/0146174 A1    May 29, 2014

(30) Foreign Application Priority Data

Nov. 16, 2012  (FR) .................................... 12 03072

(51) Int. Cl.
| | |
|---|---|
| *H04N 7/18* | (2006.01) |
| *H04N 5/357* | (2011.01) |
| *H04N 5/372* | (2011.01) |
| *H04N 5/374* | (2011.01) |

(52) U.S. Cl.
CPC ............. *H04N 7/18* (2013.01); *H04N 5/357* (2013.01); *H04N 5/372* (2013.01); *H04N 5/3743* (2013.01)

(58) Field of Classification Search
CPC .......... H04N 7/18; H04N 5/357; H04N 5/372; H04N 5/3743

USPC ........................................................ 348/144
See application file for complete search history.

(56) References Cited

U.S. PATENT DOCUMENTS

| 6,256,057 B1 * | 7/2001 | Mathews | G01C 11/02 348/144 |
|---|---|---|---|
| 6,493,021 B1 * | 12/2002 | Rouge | G01C 11/025 348/145 |
| 8,120,683 B1 * | 2/2012 | Tumer | H01L 27/14634 250/370.09 |
| 2003/0193589 A1 | 10/2003 | Lareau et al. | |

(Continued)

FOREIGN PATENT DOCUMENTS

JP     2010-93331 A     4/2010

*Primary Examiner* — Jay Patel
*Assistant Examiner* — Marnie Matt
(74) *Attorney, Agent, or Firm* — Baker Hostetler LLP

(57) ABSTRACT

A method is provided for the real-time determination of signals to be summed from signals representative of an image portion which are respectively received from detectors belonging to the same optical sensor, the detectors being organized in a matrix formed by rows and columns, the signals to be summed being received on the same column. The method also determines the time during which the detectors must acquire the signals to be summed. The method determines a value representative of a modulation transfer function of at least one lens and/or at least one mirror placed upstream of the optical sensor, and a signal-to-noise ratio of the image portion, based on a location of one of the detectors and on a signal representative of an image portion obtained from the detectors. This representative value is dependent on the number. The method searches for the number and the time maximizing the representative value.

7 Claims, 2 Drawing Sheets

(56) References Cited

U.S. PATENT DOCUMENTS

2008/0079830 A1\* 4/2008 Lepage ............... H04N 3/1525
                                                          348/295
2008/0245968 A1\* 10/2008 Tredwell ............. G01T 1/2018
                                                       250/370.09
2011/0234877 A1    9/2011 Frias et al.
2012/0273676 A1\* 11/2012 Kuijper ................ G06T 5/003
                                                          250/307

\* cited by examiner

METHOD AND SYSTEM FOR THE REAL-TIME DETERMINATION OF SIGNALS TO BE SUMMED FROM AMONG A SET OF RECEIVED SIGNALS

CROSS-REFERENCE TO RELATED APPLICATION

This application claims priority to foreign French patent application No. FR 1203072, filed on Nov. 16, 2012, the disclosure of which is incorporated by reference in its entirety.

FIELD OF THE INVENTION

The present invention relates to the field of optical image acquisition. It applies in particular to satellites for which image acquisition is performed by an optical sensor formed by a set of optical detectors placed side by side and forming a matrix.

BACKGROUND

In the prior art, use of the expression "pixel" is known to denote the item of information, representative of a portion of the image, received from one of these detectors.

In the context of this invention, more particularly, systems known as "push-broom" systems are considered. In these systems, represented in FIG. 1, the image 101 acquired by the sensor 102 scrolls in a known direction with a known speed 103. This scrolling of the image is caused for example by the movement of the satellite. Each optical detector belongs to a column denoted by i and a row denoted by j. Due to the movement of the image, a portion of the image is viewed successively by the detectors of the same column i. A processing device provides for summing, for each column, the information received from different rows and according to a given summation time. Also known in the prior art is the use of the term "integration" for this sum. This functionality is also known as TDI (Time Delay Integration).

Optical acquisition systems are known for which the sensor uses CCD (Charge-Coupled Device) fabrication technology. However, these optical acquisition systems do not provide for varying the number of rows used for carrying out the sum as a function of the location of the column on the matrix having a TDI functionality. Furthermore, optical acquisition systems using this fabrication technology do not provide for precisely taking into account variations and distortions present in particular on the lenses placed before the optical sensor. Indeed, with this technology the number of rows summed is identical for all the columns of the matrix having a TDI functionality and does not take into account image quality variations over the length of the detectors.

Also known are optical acquisition systems for which the sensor uses CMOS (Complementary Metal Oxide Semiconductor) fabrication technology. The choosing of the summation time from an item of information representative of the luminance received by the detector of the first row is known, this being done in order to maximize the quality of the acquired image. If the information received from the detector of the first row is not representative of the information received from the other detectors of the image, the determination is hence not good for the remainder of the image. Determining the summing time in order to maximize a function made up of the pair formed by the modulation transfer function, or MTF, and by the signal-to-noise ratio, or SNR, for a given reference luminance value, is also known. The modulation transfer function, or MTF, describes the clarity of the image, and the signal-to-noise ratio describes the noise of the image. However, since this determination is factory-performed from the detector of the optical acquisition system corresponding to average or minimum image quality on the detector, the transmission from the optics, therefore the SNR and MTF, varies along the detector. This determination does not provide for adapting to variations of reception conditions.

SUMMARY OF THE INVENTION

The invention therefore aims to propose an alternative method for the determination of the summation time associated with a detector.

To this end, a subject of the invention is a method for the real-time determination of a number of signals to be summed from among a set of signals representative of an image portion which are respectively received from a set of detectors belonging to the same optical sensor, the said detectors being organized in a matrix formed by rows and columns, the said signals to be summed being received on the same column. The method also provides for determining the time during which the said detectors must acquire the said signals to be summed.

The method includes a step for determining a value representative of a modulation transfer function and of a signal-to-noise ratio, or SNR, of the image portion, based on a location of one of the detectors and on a signal representative of an image portion obtained from the said detectors. This representative value is dependent on the number. The method also includes a step for searching for the number and for the time maximizing the representative value.

The method therefore provides for obtaining a value of the number of sums providing for a compromise to be made between the clarity of the image and the final signal-to-noise ratio of the image.

Advantageously, the representative value is obtained by the multiplication of the modulation transfer function and of the signal-to-noise ratio associated with the image.

Advantageously, the method additionally includes a step for moving the optical sensor relative to the image. The movement is performed in an axis for which the absolute value of the angle between the axis and a column of the optical sensor is less than a threshold. The determination step is suitable for determining the representative value, moreover, from the speed.

The threshold has a preferred value of 5°.

Advantageously, the method includes a step for memorizing the number and the time associated with the location of the detector and with a value representative of a signal representative of an image portion obtained from the detector.

Advantageously, the determination step is suitable for using data from an Attitude and Orbit Control System and/or from sensors broadcasting data representative of an optical distortion of at least one lens and/or of at least one mirror placed upstream of the said optical sensor, a value representative of a modulation transfer function of the said lens and/or of the said mirror, the controlling of a satellite, on board which is fitted the said optical sensor, and/or the tracking of the said control instructions.

Advantageously, the signal representative of an image portion is obtained moreover from at least one other optical sensor acquiring the said signal in another frequency band and/or by using another acquisition pitch.

This selection of a frequency band is achieved by an optical filter placed in front of the sensor.

Another subject of the present invention is a system including at least one optical sensor formed by a set of detectors and processing means suitable for implementing the method.

BRIEF DESCRIPTION OF THE DRAWINGS

The invention will be better understood and other advantages will become apparent from reading the detailed description of embodiments given by way of example in the following drawings.

DETAILED DESCRIPTION

Figure 1:
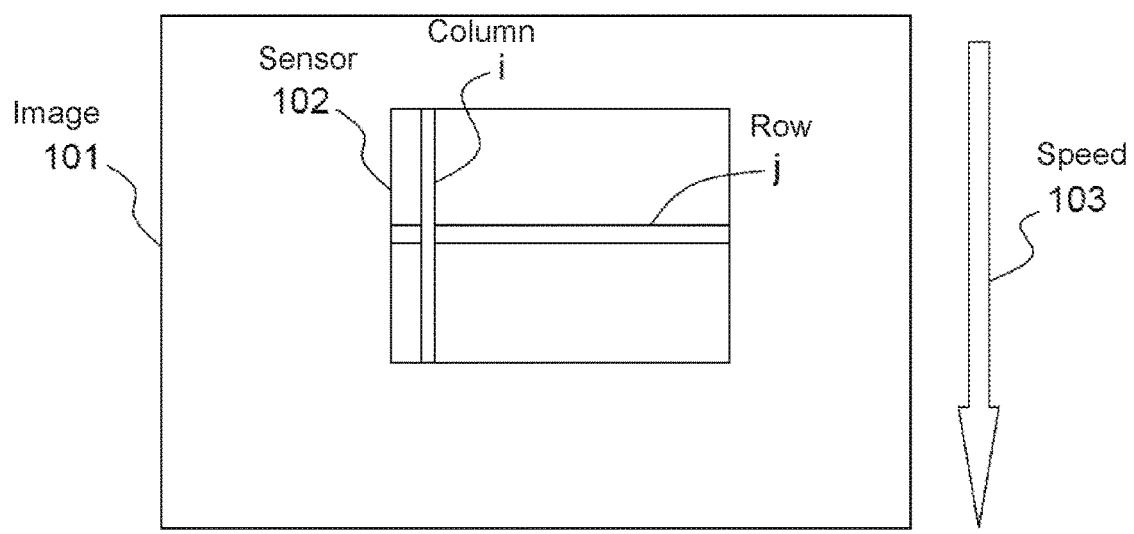
FIG. 1 presents an optical acquisition system.

The method, as presented in FIG. 1, therefore provides for determining a parameter $K_t(i)$ which depends on the number of sums, according to the column of the sensor having a TDI functionality, on the sampling time and on the integration time for the scene on the $N(i)-N_0$ physical pixels of the column i of the matrix having a TDI functionality. $N_0$ is the number of first rows which are used for an evaluation of the signal of the observed image portion. The sampling time is obtained by dividing the pitch in the direction of the columns by the speed of scrolling of the scene. The method also provides for determining a parameter $N(i)$ which represents the number of rows used to carry out the sum according to the column i of the sensor. Indeed, for an area of the scene corresponding to the surface of a scrolling pixel on the column i of the matrix having a TDI functionality, the illuminance received is assumed to be identical on this column but varies in the field. $K_t(i)$ is more precisely defined as being the ratio between the integration time $T_{int}$ associated with a column i and the sampling time $T_e$ for the detector of the column i of the sensor.

The choice of these two parameters $K_t(i)$ and $N(i)$ is made to maximize a parameter dependent on the modulation transfer function, or MTF, and on the signal-to-noise ratio, or SNR. When the integration time or the number of rows used to carry out this sum increases, the signal-to-noise ratio increases and the modulation transfer function reduces. This optimization is achieved for each physical pixel column of the matrix having a TDI functionality for the sensor referenced by i, the column number of the sensor, and i, the row number of the image.

The MTF is made up of a part dependent on the modulation transfer function of at least one lens and/or of at least one mirror placed upstream of the said optical sensor, and of a part dependent on the signals to be summed.

In other words, the MTF is not dependent on the signal that is observed (first-order linearity assumed), but it is dependent as follows:
- the optics MTF is dependent on the entire optics of the telescope upstream of the matrix
- the motion MTF is dependent on the theoretical movement of the scene relative to the matrix
- the desynchronization MTF is dependent on the time passed in the column i of the matrix to be summed and therefore on the number of detectors to be summed $N(i)$ in the column and on the actual movement of the scene.

Among the methods used to carry out this optimization, several numerical analysis methods can be used, the search domain can also be discretized, the values of the function to be optimized at these points can be calculated and an approximation of the optimal parameters can be deduced from them.

The method is implemented in an image processing device. This device is connected to the optical sensor in order to receive the items of information representative of the image.

Generally, a function that is dependent on the SNR and on the MTF is optimized under the constraint that the SNR is greater than a minimum value SNRmin and that the MTF is between two minimum and maximum boundaries, which implies that the values of the parameters $K_t(i)$ and $N(i)$ are constrained and must belong respectively to an interval $[K_{t_{min}} \; K_{t_{max}}]$ and to an interval $[N_{min} \; N_{max}]$, where $N_{min} > N_0$. $N_0$ is the number of physical rows of the matrix having a TDI functionality used to evaluate the received signal, this evaluation of the received signal in the column i of the matrix having a TDI functionality then being used in the calculation of the SNR.

Figure 2:
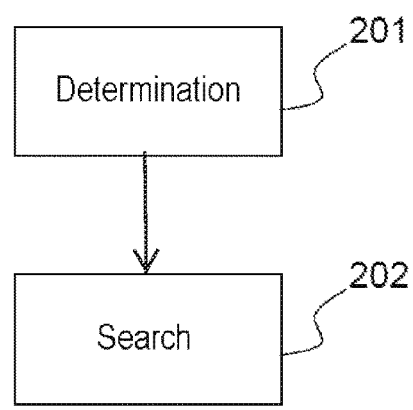
FIG. 2 presents the method according to a first aspect of the invention.

The method as presented in FIG. 2 includes two steps. A step 201 for determining a value representative of a modulation transfer function and/or of a signal-to-noise ratio of the image. This representative value is obtained for each detector and is dependent on the location of the detector and on the signal representative of the image portion received from the detector. The representative value is also dependent on the parameter $K_t(i)$ which is dependent on the integration time, time during which the physical pixel i of the detector acquires the photons which are used for the evaluation of the image signal, according to the column t of the sensor, and on the sampling time of the image signal. The value is also dependent on the parameter $N(i)$ which represents the number of physical rows used to carry out the sum according to the column i of the sensor. The method also includes a step 202 for searching for the value of the parameter $K_t(i)$ and/or of the parameter $N(i)$ which maximizes the value representative of a modulation transfer function and/or of a signal-to-noise ratio of the image.

Figure 3:
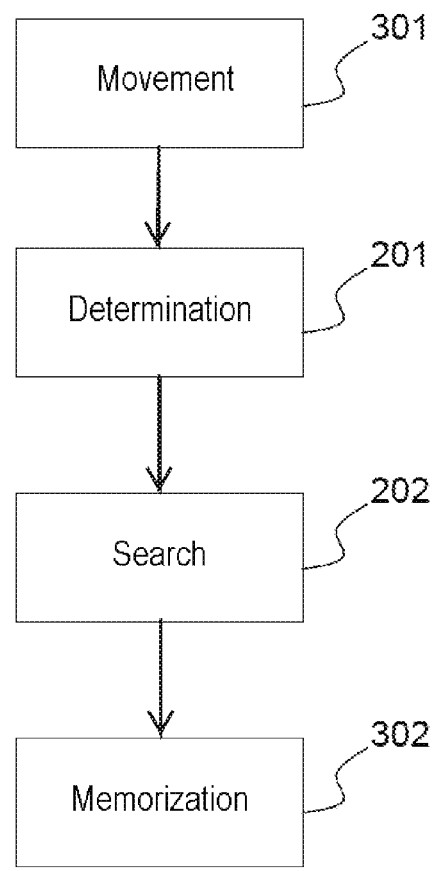
FIG. 3 presents the method according to a second aspect of the invention.

The method as presented in FIG. 3 also includes a step 301 for moving the optical sensor relative to the image and a step 302 for memorizing the sum (more specifically, the parameter $K_t(i)$ and/or the parameter $N(i)$) associated with the location of the detector and with a value representative of a signal representative of an image portion obtained from the detector.

The value of the MTF parameter, for a detector of a column j, is dependent on the value of the parameters $K_t(i)$ and $N(i)$, and on parameters known at the moment of the acquisition of the image, which are due to optical distortion, the impact of which can be calculated by optical analyses on the ground and uploaded into the device before acquisition of the scene, due to the viewing angle, due to the control law, the impact of which can be calculated by kinematic analyses and uploaded into the device before acquisition of the scene, due to the tracking of the control law via data which can either come in real time from the Attitude and Orbit Control System of the carrier or come from kinematic analyses and be uploaded before acquisition of the scene, and due to micro-vibrations, via data which can come from mechanical analyses and can be uploaded before acquisition of the scene or which can come in real time from sensors present on board the satellite.

The value of the SNR parameter, for a detector of a column I, is dependent on the value of the parameters $K_t(i)$ and $N(i)$, on system parameters denoted by $A(i)$, $B(i)$ and $C(i)$ and on the value of the image signal $S(i,j)$. $S(i,j)$ is obtained by the transformation of the information representative of a portion of the image received from the detector of the column i and of the row j. $A(i)$ is the coefficient which represents the noise component in front of the noise component proportional to the signal, BO represents the coefficient in front of the noise component proportional to the square root of the signal, CO represents the coefficient of the component independent of the signal.

The device implementing the method of the invention therefore disposes of a means of evaluation of the signal $S(i,j)$ obtained before the adjustment of the value of the parameters KM and NO. This evaluation means provides a measurement of the signal ALP which can be less well resolved or noisier than the measurement after summation. $S(i,j)$ can for example be the signal obtained in the $N_0$ first row or rows ($N_0$ is known and fixed by the design of the system) of the optical sensor and having undergone a sum with a fixed number of rows dependent on the parameter $K_{t_0}$. $K_{t_0}$ is a parameter of the detection system and represents the elementary integration time (corresponding to one row) over the sampling time for the $N_0$ first rows.

$S(i,j)$ can also be a signal supplied by another sensor able to acquire a signal in another frequency band and the acquisition of which is carried out before the acquisition by the CMOS sensor. For example, in the case in which the detectors of this other sensor are placed before the CMOS detectors, by virtue of their positions in the focal plane and due to the orientation and the speed of scrolling of the scene.

Therefore, following acquisition of an item of information representative of a portion of the image by a detector (detector located at column i, row j), this information is transformed in order to obtain the signal $S(i,j)$ and the values of the parameters MO and NO), which optimize the function F(MTF,SNR), are then determined.

The MTF is dependent on spatial frequency variables $f_x$ and $f_y$ expressed as pixel$^{-1}$, and on i, the number of the column to which the detector belongs. In general, the MTF value is calculated for the pairs ($f_x$=0.5 pixel$^{-1}$, $f_y$=0) and ($f_x$=0, $f_y$=0.5 pixel$^{-1}$) but other frequency values to optimize the quality of the image can be chosen.

$$MTF(i,f_x,f_y)=MTF_{optics}(i,f_x,f_y) \cdot MTF_{static}(f_x,f_y) \cdot MTF_{motion}(f_x,f_y) \cdot MTF_{desynchronization}(i,f_x,f_y)$$

where $MTF_{optics}(i,f_x,f_y)$ is the MTF of the optics dependent on the telescope mounted on the satellite. The MTF values of the optics can come from measurements, optical analyses or sensors placed on board the satellite.

$$MTF_{static}(f_x,f_y) = MTF_{broadcast}(i,f_x,f_y) * \mathrm{sinc}\left(\pi \frac{P_x}{P_{ref}} f_x\right) * \mathrm{sinc}\left(\pi \frac{P'_{acq}}{P_{ref}} f_y\right)$$

where $\mathrm{sinc}(x) = \dfrac{\sin x}{x}$

Figure 4:
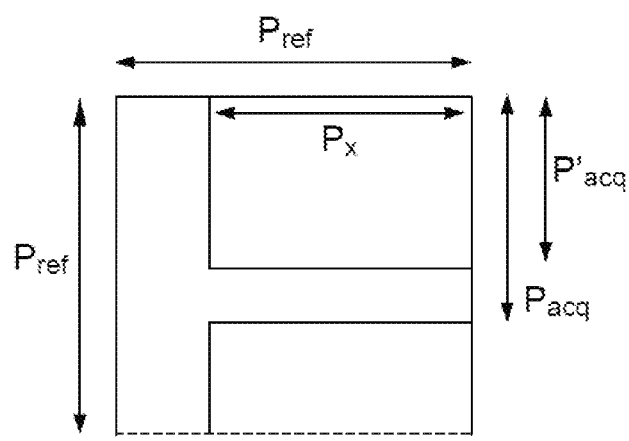
FIG. 4 presents the start of a column of a CMOS detector.

FIG. 4 presents the start of a column of a CMOS detector, the area in white represents the photosensitive surface of the detector and parameters $P_{acq}$, $P_x$ and $R_{ref}$ are represented on this drawing.

$MTF_{broadcast}(i,f_x,f_y)$ is the broadcast MTF. The value of the broadcast MTF is known by measurements which are carried out on the satellite before it is placed in orbit.

$$MTF_{motion}(f_x,f_y) = \mathrm{sinc}(\pi * K_{t_{avg}}(i) * f_y)$$

Hence, $K_t(i)$ is defined as being the ratio between the integration time $T_{int}$ of a row and the sampling time $T_s$ which corresponds to $P_{ref}$ for the detector of the column of the sensor.

Hence $$K_{t_{avg}}(i) = \frac{N_0 K_{t0} + (N(i) - N_0) K_t(i)}{N(i)},$$

where $N(i)$ is the number of rows used for the sum of the information items received from the detectors of the column i of the sensor.

$$MTF_{desynchronization}(i,f_x,f_y) = G_x(i,N(i),f_x) * G_y(i,N(i),f_y)$$

$MTF_{desynchronization}$ represents the MTF due to the desynchronization of the speed of the scene with respect to the operation of the TDI.

$G_x(i,N(i),f_x)$ is given for the x axis (perpendicular to a column) of the focal plane, the detector i and the number of pixels to be summed N, for the spatial frequency fx (do not forget that the MTF (Modulation Transfer Function) value is given for each spatial frequency).

$G_x(i,N(i),f_x)$ is the component of the desynchronization MTF according to this axis due to the fact that the actual scrolling speed and its orientation over the duration of integration and of summation for the N(i) pixels in the column of the signal of the scene which scrolls over the matrix diverges from the value and from the theoretical direction where this speed is perfectly synchronized with the scrolling of this point and the direction perfectly along the column of the matrix $G_y(i,N(i),f_y)$: similarly for the y axis (along a column).

In other words, an approximation of $G_x$ and $G_y$ is given below in the case where the signal $S(i,j)$ comes from the $N_0$ first rows acquired with the parameter $K_{t0}$.

$$G_x(i, N, f_x) \sim \frac{\sin(\pi \tan(g(i)) N(i) K_{t_{avg}}(i) f_x)}{N(i) \mathrm{sinc}(\pi \tan(g(i)) K_{t_{avg}}(i) f_x)}$$

In this equation, g(i) is the total shift angle. This angle represents the angle with respect to the column i of the matrix having a TDI functionality of the scrolling speed of the scene in the focal plane of the instrument. This angle is the sum of the influence of the following elementary terms:
  the optical distortion uploaded before acquisition of the scene, based on optical analyses and on measurements carried out before launch,
  control of the line of sight, the characteristics of which can be uploaded before acquisition of the scene, based on kinematic analyses,
  the tracking of control instructions of the line of sight, the characteristics of which can be uploaded before acquisition of the scene, based on kinematic analyses or which can come from real-time data of the Attitude and Orbit Control System, or AOCS, of the carrier vehicle. The Attitude and Orbit Control System is an assembly of on-board equipment and software which provides the control function of a spacecraft with a view to setting it with the desired attitude and to adjusting its orbit to the requirements of the mission.

micro-vibrations, the characteristics of which can come from mechanical analyses uploaded before acquisition of the scene or from real-time data from sensors fitted on board the carrier vehicle.

In other words, the optical distortion of the telescope, the control of the satellite and the tracking of instructions feature directly in the expression of the desynchronization MTF in the terms Gx and Gy since they intervene directly in the calculation of the actual scrolling speed V(i) and of its orientation (angle of shift g(i)).

$G_y$ can be approximated as follows:

$$G_y(i, N, f_y) \sim \frac{\sin(\pi(V(i)-1)N(i)K_{tavg}(i)f_x)}{N(i)\mathrm{sinc}(\pi(V(i)-1)K_{tavg}(i)f_x)}$$

v(i) is the scrolling speed of the scene over the matrix having a TDI functionality, for a detector of the column i of the sensor, and it is represented in FIG. 1 by the element 103. Taking account of the optical distortion of the instrument, this speed is dependent on the number i of the column in the matrix having a TDI functionality. This speed is expressed in pixels divided by a time. This speed is obtained from the speed of the satellite on its orbit, from the control law, from the angular speeds of the Euler angles of the satellite which can be uploaded before acquisition of the scene based on analyses or obtained in real time by the Attitude and Orbit Control System on board the carrier vehicle, from the characteristics of the micro-vibrations uploaded before acquisition of the scene based on mechanical analyses or obtained by sensors on board the carrier vehicle in real time and from the characteristics of the optics—focal and distortion characteristics—uploaded before acquisition of the scene based on optical analyses and on measurements performed before the launch.

By considering that the signal S(i,j) is received by the detector located in the column and coming from the row j, of the scene, then the SNR parameter is thus modelled. This signal is acquired with a parameter $K_{t_0}$, for the $N_0$ first rows. The noise in the signal is dependent on the following quadratic sum:

$$\sqrt{A(i)\left(\frac{K_t(i)}{K_{t0}}S(i,j)\right)^2 + B(i)\left(\frac{K_t(i)}{K_{t0}}S(i,j)\right) + C(i)^2}$$

This expression represents a read noise which is proportional to the value of the signal, to the photonic noise and to a noise independent of the signal. This independent noise includes dark current noise and quantization noise. Therefore for the N(i) rows used for the sum, the noise has the following value:

$$\mathrm{Noise}(N(i), K_t(i), S(i,j)) = \sqrt{(N(i)-N_0)\left[A(i)\left(\frac{K_t(i)}{K_{t0}}S(i,j)\right)^2 + B(i)\left(\frac{K_t(i)}{K_{t0}}S(i,j)\right) + C(i)^2\right] + N_0[A(i)S(i,j)^2 + B(i)S(i,j) + C(i)^2]}$$

Consequently, the value of the signal-to-noise ratio is as follows:

$$SNR(N(i), K_t(i), S(i,j)) = \left[N_0 + (N(i) - N_0)\frac{K_t(i)}{K_{t0}}\right]\frac{S(i,j)}{\mathrm{Noise}(N(i), K_t(i), S(i,j))}$$

If the function F(FTM.SNR) to be optimized is the product FTM*SNR then the expressions of $\mathrm{MTF}_{optic}(i,f_x,f_y)$ and $\mathrm{MTF}_{static}(f_x,f_y)$ are independent of N(i) and $K_t(i)$. This can provide for simplifying the expression to be optimized which is obtained from the product of the preceding functions.

The values of the parameters $K_t(i)$ and N(i) are discrete and the number of values is finite. It is therefore possible to calculate the function F(FTM.SNR) for the set of these values and then find the pair $(K_t(i),N(i))$ which maximizes the function F(FTM.SNR), this pair being dependent on S(i,j) and on i.

Since this optimization must be carried out in real time, it is also possible to calculate, for the set of values of S(i,j) and of i, the optimal value of the pair $(K_t(i),N(i))$ as described above. These items of data are then placed in a table and to accelerate the reading of these tables it is possible to consider that the values of the pair $(K_t(i),N(i))$ are constant for a range of similar indices i and for a range of similar values of the signal S(i,j).

It is also possible that the device using this method transmits, in addition to information representative of the image, the acquisition characteristics of the detector (i,j). That is in particular the number of rows N(i) having been used for the sum, or the parameter $K_t(i)$ having been used for carrying out this sum during the acquisition of information by the detector (i,j). The transmission of this data is useful for calibration and radiometric equalization, which corrects radiometric disparities between the pixels of the image.

The invention claimed is:

1. A method for a real-time calculation of a number of signals to be summed from among a set of signals representative of an image portion which are respectively received from a set of detectors belonging to a same optical sensor, the set of detectors being organized in a matrix formed by rows and columns, said number of signals to be summed being received on a same column, and for a determination of a time during which the set of detectors must acquire said number of signals to be summed, the method comprising:
   (a) a step of determining a representative value representative of an image portion modulation transfer function and a signal-to-noise ratio, based on a location of one of the set of detectors and based on a signal representative of the image portion obtained from the set of detectors, said representative value depending on the number of signals,
   (b) a step of calculating for the number of signals and for the time maximizing said representative value, and,
   steps (a) and (b) being followed by:
   (c) a step of acquiring said number of signals to be summed on the same column.

2. The method according to claim 1, in which said representative value is obtained by a multiplication of the modulation transfer function and of the signal-to-noise ratio associated with the image portion.

3. The method according to claim 1, in which the set of detectors are organized in a matrix, and the method additionally includes:

a step of moving the optical sensor relative to the image portion, the step of moving being performed in an axis for which an absolute value of an angle between the axis and a column of the optical sensor is less than a threshold;

the step of calculating being suitable for determining the representative value from a speed said moving.

4. The method according to claim 1, further comprising:

a step of memorizing a number of the number of signals and the time associated with the location of the one of said set of detectors and associated with the representative value of the set of signals representative of the image portion obtained from the one of said set of detectors.

5. The method according to claim 1, in which the calculating step includes using data from an Attitude and Orbit Control System and/or from sensors broadcasting data representative of:

an optical distortion of at least one lens and/or of at least one mirror placed upstream of the optical sensor, a value representative of the modulation transfer function of the lens and/or of the mirror, a controlling of a satellite having the optical sensor, and/or a tracking of control instructions.

6. The method according to claim 1, in which the signal representative of the image portion is obtained from at least one additional optical sensor acquiring the signal in another frequency band and/or by using another acquisition pitch.

7. A system comprising:

at least one optical sensor formed by a set of detectors processing means suitable for implementing the method according to claim 1.

* * * * *